United States Patent [19]

Fritz

[11] 4,276,803

[45] Jul. 7, 1981

[54] STOP TAB FOR CAPTURE COMBINATION ACTION SYSTEMS USED IN ELECTRONIC ORGANS

[75] Inventor: William L. Fritz, Cincinnati, Ohio

[73] Assignee: Baldwin Piano & Organ Company, Cincinnati, Ohio

[21] Appl. No.: 121,539

[22] Filed: Feb. 14, 1980

[51] Int. Cl.[3] .......................... G09B 15/02; G10B 3/10

[52] U.S. Cl. .......................................... 84/343; 84/369; 84/477 R

[58] Field of Search .................................. 84/343–345, 84/369, 370, 464 R, 464 A, 477 R

[56] References Cited

U.S. PATENT DOCUMENTS

| | | | |
|---|---|---|---|
| 3,491,645 | 1/1970 | Schwartz et al. | 84/343 |
| 3,797,357 | 3/1974 | Thomas et al. | 84/343 X |
| 3,965,791 | 6/1976 | Thomas et al. | 84/343 |
| 4,019,418 | 4/1977 | Kimble et al. | 84/343 |
| 4,127,756 | 11/1978 | Peterson et al. | 84/343 X |
| 4,157,051 | 6/1979 | Peterson et al. | 84/343 |
| 4,173,166 | 11/1979 | Koepke | 84/343 |

*Primary Examiner*—S. J. Witkowski

*Attorney, Agent, or Firm*—Frost & Jacobs

[57] ABSTRACT

A stop tab mechanism for a particularly electronic organ of the type having a capture combination system. The stop tab mechanism includes an elongated stop tab having a front portion, a central portion, and a rear portion, a mounting bracket for the stop tab, spaced apart front and rear rests secured to the mounting bracket, guide means mounting the central portion of the stop tab for pivotal movement relative to the rests, including a spring urging the central portion of the stop tab into contact with the front and rear rests, and switch means operatively connected to the rear portion of the stop tab. The stop tab has a neutral position in which its central portion is seated against both of the rests and held in engagement therewith by the spring means, an on position in which the front portion of the stop tab is depressed, the tab pivoting about the rear seat to move its rear portion upwardly, and an off position in which the front portion of the stop tab is elevated, the stop tab pivoting about the front seat to move its rear portion downwardly. The spring means act to return the stop tab to its neutral position when the stop tab is released.

9 Claims, 7 Drawing Figures

STOP TAB FOR CAPTURE COMBINATION ACTION SYSTEMS USED IN ELECTRONIC ORGANS

SUMMARY OF THE INVENTION

This invention relates to electronic organs, and more particularly to a stop tab for a capture combination action system used in an electronic organ.

Over the years a wide variety of systems has been developed for controlling organ stops to permit the performer to change the stop combination on the instrument, including capture combination systems in which the stop combination may be quickly changed to another previously set combination by merely depressing a switch control, such as a thumb piston or toe stud. In the conventional approach, when the thumb piston or toe stud is depressed, the stop control set to be activated by the particular piston or toe stud in question is moved to the "on" state by either purely mechanical or electromechanical means. Such movement not only provides the obvious function of energizing the required stops, but the "on" position of the stop control also provides a visual indication to the performer as to which of the stops have been energized. In this type of capture system the operator can easily program or set any combination of stops desired into any piston by manually turning on the appropriate stops, and simultaneously holding the "set" and the piston or toe stud into which the combination is to be programmed. With this arrangement, the selected combination will then be activated whenever that particular piston or toe stud is again depressed.

Capture combination systems of the character described have a number of disadvantages, among which are cost effectiveness, speed of action, and ease of operation. In the modern electronic organ the stop switches, which are the ones directly controlled by the drawbar or stop tab mechanism, control a minute amount of power, typically in the milliwatts range. By contrast, the power supplied to the solenoid-activated draw knob or stop mechanism to control the stop switch is in the tens of watts range. Thus, tens of watts of power are required to control a few milliwatts of power, which is an extremely inefficient arrangement from the standpoint of the amount of power required to operate the system. In addition, the system is expensive in terms of the cost of the solenoids used in the mechanisms as well as the power switching electronics and power supply required to drive the solenoids. Another major disadvantage of such systems is their sluggish operation and the presence of mechanically produced noise, which can be of substantial magnitude when numerous stops are simultaneously actuated.

In order to alleviate the foregoing problems, it has hitherto been proposed in U.S. Pat. No. 4,157,051, issued June 5, 1979 to R. H. Peterson et al, to utilize a stop tab control system in which the stop tabs are spring biased to assume a neutral position from which they can be momentarily moved up or down against the action of their springs, the system including an electrical latching circuit having two stable states responsive to movement of the stop tab. When the tab is moved downwardly from the neutral position, the circuit is latched into a first state which turns on the associated stop and also energizes a light emitting diode mounted directly on the stop tab. When the tab is moved upwardly from the neutral position, the associated stop and the light emitting diode are turned off.

A principal object of the present invention is to provide an improved capture action system utilizing an improved form of momentary-acting stop tab mechanism.

The present invention utilizes stop tabs or stop controls of the momentary-acting type in which the organist depresses the tab to turn on the stop, after which the tab automatically returns to a center rest or neutral position, and the organist deflects the tab upwardly to turn off the stop after which the tab again automatically returns to the center rest position. The tabs are thus moved by the same motions that the organist uses with conventional detent-type tongue tabs. When the tab is depressed to turn on the stop, an indicator light overlying the tab is turned on to give the organist a visual indication that the stop is "on", and the indicator light is extinguished when the tab is momentarily moved to the "off" position.

In conventional detent-type stop tabs, the organist normally uses a full downward stroke to set the stop tab, which remains in this position until the stop is cancelled. However, when the stop is turned off, the organist uses a shorter upwardly directed stroke to move the stop tab to the off position. In this latter operation, the stop tab is often merely flipped upwardly, continuing by its own momentum to the off position.

The stop tab of the present invention permits the organist to use the same type of motions to set and cancel the stop tab as is used with conventional stop tabs, thereby providing a normal "feel" when the tabs are displaced. The tabs are provided with two fulcrum points, the first of which is utilized when the stop tab is depressed, resulting in a full downward stroke to set the associated stop. The second fulcrum is utilized when the stop tab is lifted, resulting in a shorter upwardly directed stroke to cancel the associated stop. With this arrangement, the stop tabs will maintain their normal "feel" and travel when they are depressed by the organist, while permitting the tabs to be turned off utilizing minimal hand movement and pressure.

The stop tab mechanism also includes a unique spring and damping arrangement which materially reduces the audible "thump" normally encountered when conventional stop tabs are turned on and off, as well as the tendency of the tabs to bounce if struck a sharp blow, which can result in deactivation of the holding circuit. The stop tab also incorporates guide means which permit accurate adjustment and uniform alignment of the stop tabs and also implements their installation and servicing.

DETAILED DESCRIPTION

Figure 1:
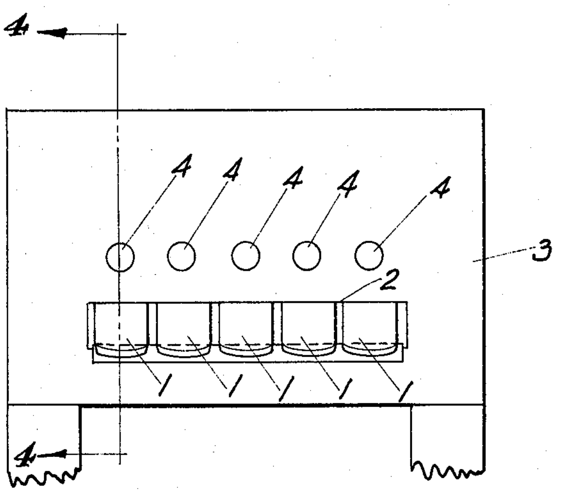
FIG. 1 is a front elevational view of a series of stop tabs in accordance with the invention.

Considering first the construction and operation of the stop tab mechanism, reference is made to FIG. 1 of the drawings which illustrates an exemplary set of stop tabs 1 projecting outwardly through an elongated opening 2 in a tab panel 3 adapted to be mounted on the organ console, an indicator light 4 being mounted on the tab board immediately above each of the tabs 1. It will be understood at the outset that the number of stop tabs illustrated is exemplary only, and that the number may vary depending upon the number of stops being utilized in any give organ division. Furthermore, the stop tab 1 of the present invention may be used in combination with the capture combination action system described in copending application Ser. No. 06/121,591, filed Feb. 14, 1980, entitled *CAPTURE COMBINATION ACTION SYSTEM FOR ELECTRONIC ORGANS,* and assigned to the same assignee.

Figure 3:
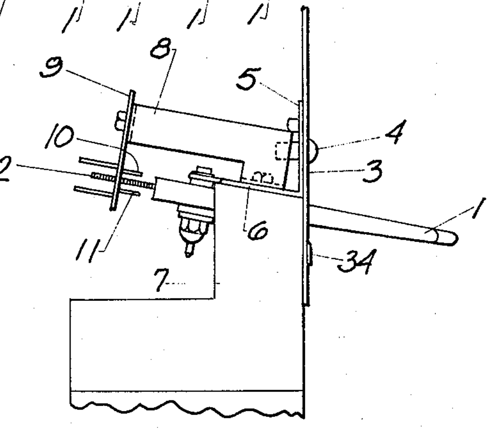
FIG. 3 is an end elevational view thereof.

As seen in FIG. 3, the tab panel 3 is mounted on the upstanding flange 5 of a bracket 6 which projects rearwardly from the tab board at an upwardly inclined angle, the bracket being mounted on spaced apart posts 7 forming a part of the organ case. The stop tabs 1 are suspended from the bracket 6, the bracket also serving to mount the rearwardly projecting arms 8 which support a contact board 9 having sets of stationary contacts 10 and 11 adapted to be selectively engaged by spring contacts 12 which project forwardly from the contact board between and in spaced relation to the sets of stationary contacts. The projecting ends of the spring contacts are engaged by the rearmost ends of the stop tabs, the spring contacts being in axial alignment with the stop tabs when the tabs are in their neutral or rest position.

Figure 4:
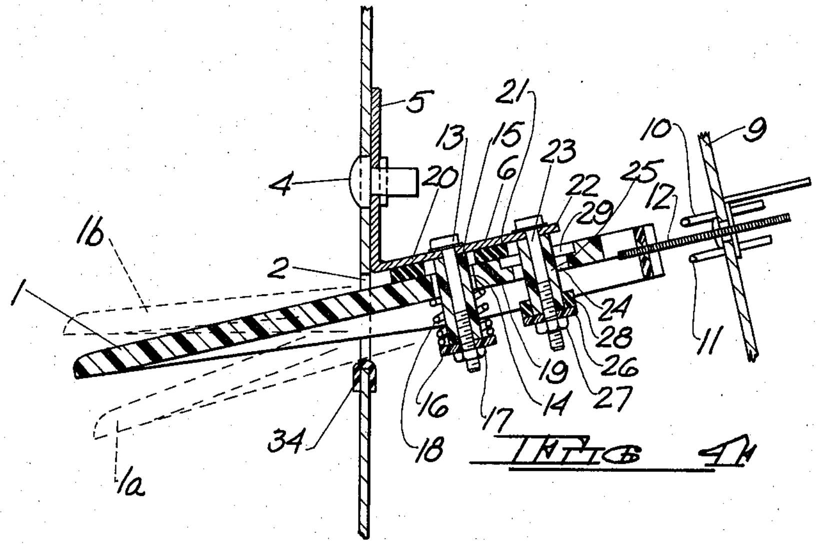
FIG. 4 is a vertical section view taken along the line 4—4 of FIG. 1 illustrating a stop tab in its neutral position, the "on" and "off" positions of the stop tab being diagrammatically indicated in dotted lines.

As seen in FIG. 4, each stop tab is suspended beneath the bracket 6 by means of a screw 13 which extends downwardly through a circular opening 14 in the stop tab, the screw being surrounded by a plastic guide sleeve 15 which freely passes through the opening 14. The guide sleeve 15 extends between the bracket 6 and an annular shim 16, the guide sleeve being held on the screw 13 by means of a nut 17 underlying the shim. A helical spring 18 surrounds the guide sleeve 15 and extends between the undersurface 19 of the stop tab and the shim 16, the spring acting to urge the stop tab in the direction of bracket 6 where it contacts and seats against a pair of dead rubber rests 20 and 21 secured to the undersurface of the bracket 6 on opposite sides of the circular opening 14. Preferably the rests 20 and 21 will extend continuously along the undersurface of bracket 6 so that they will be contacted by each of the stop tabs in the series, although, if desired, separate rests may be provided for each tab.

Figure 2:
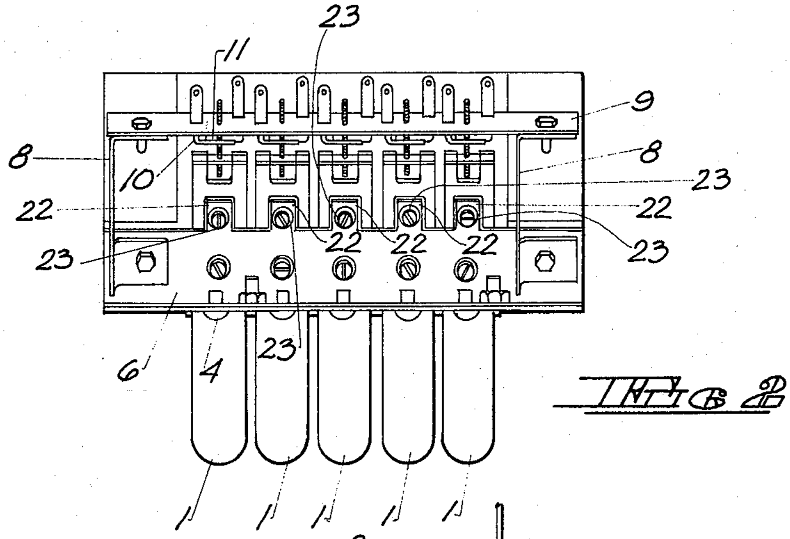
FIG. 2 is a top plan view of the stop tab assembly of FIG. 1.

As best seen in FIG. 2, the bracket 6 has a series of rearwardly projecting tongues 22 overlying the stop tabs, the tongues each mounting a screw 23 which, as seen in FIG. 4, projects downwardly through an elongated opening 24 in the tab, the screw 23 being surrounded by a plastic guide sleeve 25 which is similar to the guide sleeve 15 but preferably somewhat shorter, the sleeve being held on the screw by an annular shim 26 and nut 27. The guide sleeve also mounts a rubber washer 28 adapted to seat against the shim 26. The upper surface of the stop tab 1 is provided with a recess 29 of a size to receive the tongue 22 on bracket 6 when the stop tab is depressed.

Figure 5:
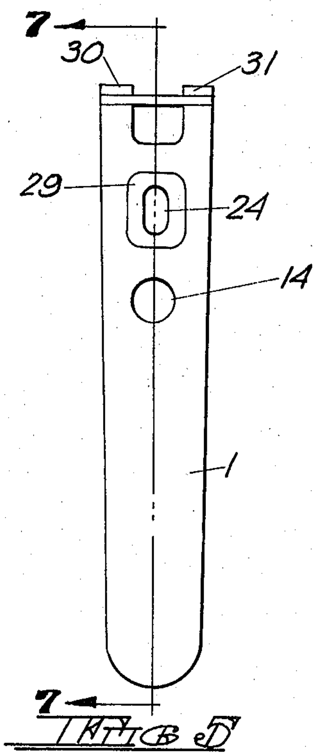
FIG. 5 is a top plan view of a stop tab.
Figure 6:
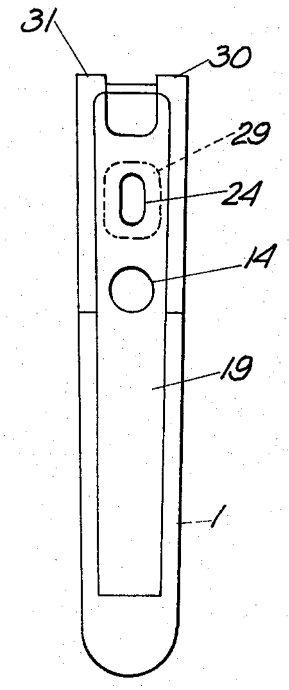
FIG. 6 is a bottom plan view of the stop tab.
Figure 7:
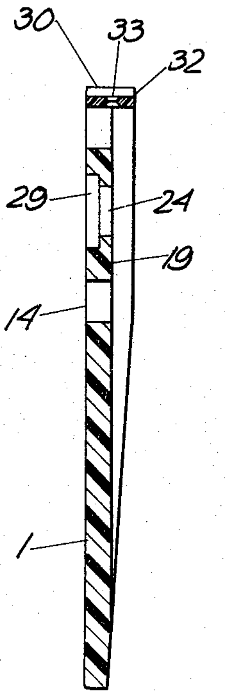
FIG. 7 is a vertical sectional view of the stop tab taken along the line 7—7 of FIG. 5.

As best seen in FIGS. 5 through 7, the rearmost end of each stop tab is bifurcated to provide opposing arms 30 and 31 which mount a plastic plate 32 having an opening 33 therein through which the free end of contact spring 12 is adapted to project, as seen in FIG. 4, the opening 33 being slightly larger in diameter than the spring and preferably having its opposite sides beveled so that the contact spring will readily slide relative to the opening 33 when the tab is moved.

In use, the stop tab will normally occupy the "neutral" or rest position shown in solid lines in FIG. 4, in which the upper surface of the tab is maintained in firm contact with the rests 20 and 21 by means of the helical spring 18 which lies midway between the rubber rests and hence exerts a substantially uniform pressure against each rest. When the stop tab is depressed by the organist, the stop will pivot about the rearmost edge of rearward rest 21, which serves as a first fulcrum, thereby compressing the spring 18, the stop tab assuming the position illustrated in dotted lines at 1*a* in which the stop tab seats against a rubber cushion 34 extending about and covering the lowermost longitudinal edge of opening 2. The spring 18 is chosen so that its compressive force simulates the "normal" feel of a conventional stop tab. As the stop tab is depressed, it effectively pivots about the rearward rests 21, and the rearmost end of the stop tab deflects the spring contact 12 upwardly into contact with a stationary contact 10, thereby energizing the circuits controlled by the stop tab. When the organist releases the stop tab, it will immediately return to its neutral position under the influence of spring 18. The guide sleeves 15 and 23 serve to maintain the stop tab in proper alignment and yet do not interfere with its movement.

When it is desired to deactivate the stop, the stop tab is lifted upwardly to the position shown in dotted lines at 1*b*, the tab pivoting about the forward edge of forward rest 20, which serves as a second fulcrum. Due to the location of the second fulcrum, a much lesser degree of movement is required to deflect the spring contact 12 into contact with the underlying stationary contact 11, and the spring 18 is compressed to a lesser extent than when the stop tab is depressed and hence requires less force, thereby enabling the organist to turn off the stop rapidly and with a minimum of hand movement and effort. When lifted, the stop seats against the rubber washer 28 on guide sleeve 25, which establishes the degree of movement of the stop tab when lifted and also serves to eliminate noise. The degree of lifting movement of the stop tab may be adjusted by varying the thickness of the rubber washer 28 and/or the shim 26. Similarly, the compression of spring 18 may be adjusted by varying the thickness of shim 16.

It will thus be observed that the construction of the stop tab of the present invention permits the organist to use the same type of motions to set and cancel the stop tabs as is used with conventional stop tabs, thereby providing a normal "feel" when the tabs are displaced. A first fulcrum is formed by the rearward edge of rearward rest 21 and permits a full downward stroke for the stop tab to set the associated stop. A second fulcrum is formed by the forward edge of foreward rest 20 and permits a shorter upward stroke for the stop tab to cancel its associated stop. This arrangement permits the stop tabs to retain the "feel" of conventional detent-type stop tabs.

What is claimed is:

1. A stop tab mechanism for an electronic organ, said stop tab mechanism comprising an elongated stop tab having a front portion, a central portion, and a rear portion, a mounting bracket for said stop tab, spaced apart front and rear rests secured to said mounting bracket, guide means mounting the central portion of said stop tab for pivotal movement relative to said rests, including spring means urging the central portion of said stop tab into contact with said front and rear rests, switch means operatively connected to the rear portion of said stop tab, said stop tab having a "neutral" position in which its central portion is seated against both of said rests and held in engagement therewith by said spring means, an "on" position in which the front portion of the stop tab is depressed, the stop tab pivoting about said rear rest to move its rear portion upwardly, and an "off" position in which the front portion of the stop tab is elevated, the stop tab pivoting about the said front rest to move its rear portion downwardly, said spring means acting to return said stop tab to its "neutral" position when the stop tab is released.

2. The stop tab mechanism claimed in claim 1 wherein the central portion of said stop tab has an opening therein lying between the said front and rear rests, said guide means including a guide sleeve secured at one end to said bracket and extending freely through said opening, said guide sleeve having an enlarged shim at its opposite end, said spring means comprising a helical spring surrounding said guide sleeve and extending between said stop tab and said shim.

3. The stop tab mechanism claimed in claim 2 wherein said stop tab has a second opening therein to the rear of said rear rest, and wherein said guide means includes a second guide sleeve secured at one end to said bracket and extending freely through said second opening, said second guide sleeve having an enlarged shim at its opposite end, said shims supporting a resilient washer surrounding said second guide sleeve.

4. The stop tab mechanism claimed in claim 3 wherein a contact board lies in spaced relation to the rear of said stop tab, and wherein said switch means includes a spring contact projecting forwardly from said contact board, and means operatively connecting said spring contact to the rear portion of said stop tab.

5. The stop tab mechanism claimed in claim 4 wherein the rear portion of said stop tab is bifurcated and mounts a plate having an opening therein of a size to slidably receive said spring contact, whereby said spring contact will be deflected upon pivotal movement of said stop tab.

6. The stop tab mechanism claimed in claim 5 wherein said bracket is elongated and mounts a plurality of said stop tab mechanisms in side-by-side relation, wherein said bracket mounts a tab panel having an elongated opening therein through which the front portions of said stop tabs project, and wherein said tab panel mounts an indicator light overlying each of said stop tabs.

7. The stop tab mechanism claimed in claim 6 wherein said bracket is inclined upwardly with respect to said tab panel, whereby said stop tabs are inclined downwardly from rear to front when in their "neutral" position.

8. The stop tab mechanism claimed in claim 3 including a tongue projecting rearwardly from said bracket, said second guide sleeve being mounted on said tongue, said stop tab including an upper surface, and wherein the stop tab has a recess extending inwardly from said upper surface of said stop tab of a size to receive said tongue when the stop tab is depressed.

9. The stop tab mechanism claimed in claim 8 wherein each of said guide sleeves is secured to said bracket including a screw extending through each of the guide sleeves to secure said guide sleeves to said bracket, and wherein the said second guide sleeve is shorter than said first guide sleeve.

* * * * *